Figure 1:
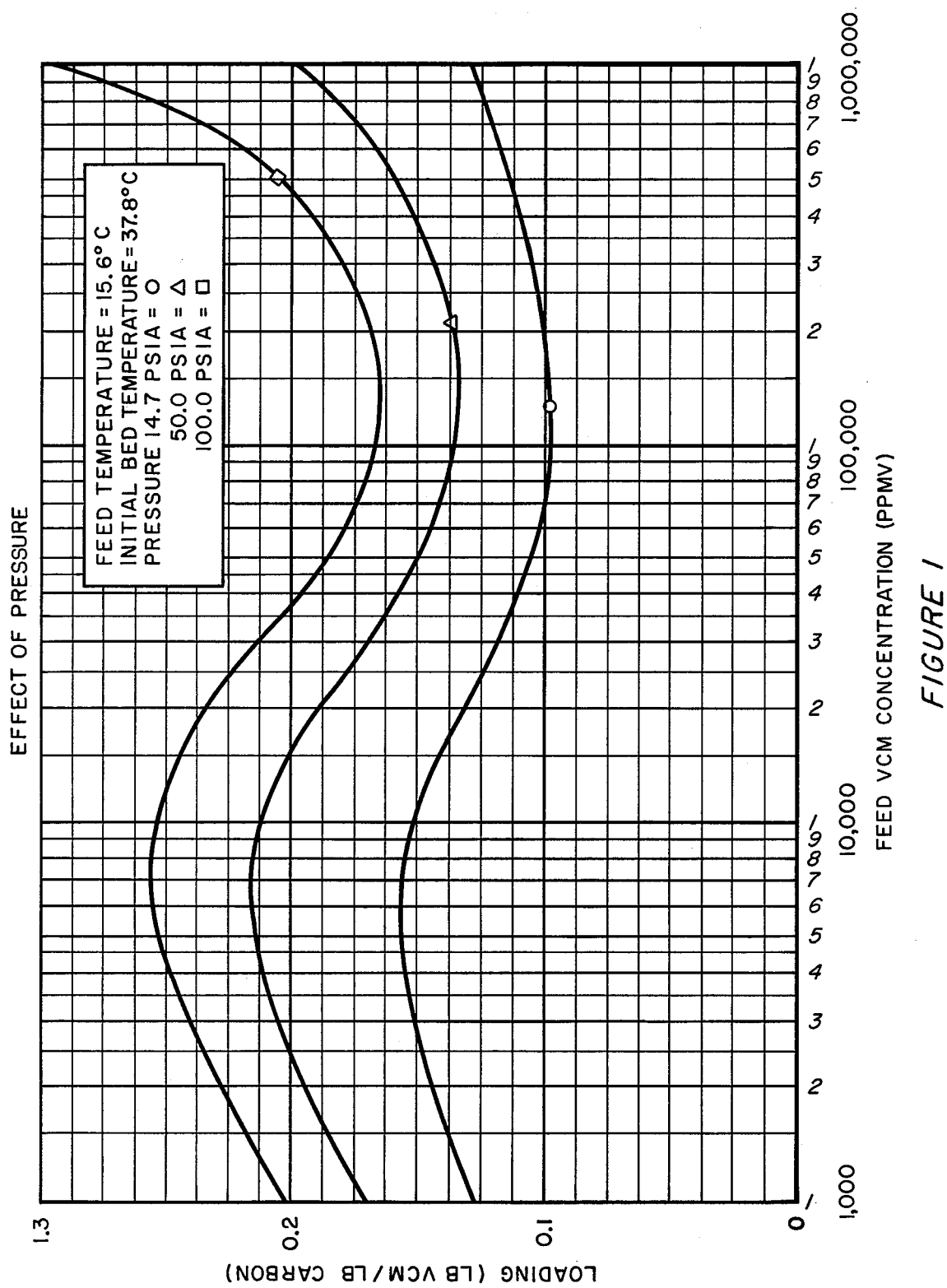

United States Patent [19]

Eisenstein et al.

[11] 4,098,593
[45] Jul. 4, 1978

[54] ADIABATIC VCM ADSORPTION ON CARBON

[75] Inventors: Andrew J. Eisenstein, Ponca City; Richard A. Frohreich, Norman; John F. Scamehorn, Ponca City, all of Okla.

[73] Assignee: Continental Oil Company, Ponca City, Okla.

[21] Appl. No.: 769,375

[22] Filed: Feb. 16, 1977

[51] Int. Cl.$^2$ ............................................. B01D 51/10
[52] U.S. Cl. ........................................... 55/71; 55/62; 55/74
[58] Field of Search ................ 55/71, 74, 62; 423/240, 423/245

[56] References Cited

U.S. PATENT DOCUMENTS

| | | |
|---|---|---|
| 3,807,138 | 4/1974 | Bellisio ........................................ 55/71 |
| 3,983,216 | 9/1976 | Sudduth et al. ............................ 55/71 X |
| 3,984,218 | 10/1976 | Patel et al. ................................ 55/74 X |

Primary Examiner—Charles N. Hart
Assistant Examiner—E. Rollins Cross
Attorney, Agent, or Firm—Cortlan R. Schupbach, Jr.

[57] ABSTRACT

A method for improving carbon bed loadings by diluting the vapor feed in order to produce optimum VCM concentrations for the adiabatic adsorption of VCM on dry activated carbon beds. The optimum concentrations are determined for each concentration and temperature of vapor gas.

3 Claims, 6 Drawing Figures

ADIABATIC VCM ADSORPTION ON CARBON

This invention relates to a method for the adiabatic adsorption of VCM on activated carbon. More particularly, this invention relates to a method for maximizing adiabatic VCM adsorption on activated carbon by diluting high feed stream concentrations to optimum conditions.

Vinyl chloride monomer (VCM) has been declared a carcinogenic material and many regulations have been published to reduce personal exposure. Vinyl chloride monomer is the basis of polyvinyl chloride, a polymer of many diverse uses which is in widespread use throughout the world. The emergence in 1974 of vinyl chloride as a cause of hemangiosarcoma of the liver focused attention on the control of emission of this chlorinated hydrocarbon into the environment.

Conventional recovery systems in polyvinyl chloride plants have not effected complete and economical separation of vinyl chloride from inert gases which are introduced into the polymerization process. Purges of these inert gases from various phases of the process contained vinyl chloride and in the past have been vented to the atmosphere, where such vapors constitute concern. Many methods are known for removal of vinyl chloride monomer from gas streams emitted from the PVC polymerization process, but each has disadvantages. For example, scrubbing of inert gas streams containing vinyl chloride monomer is a reliable but very uneconomical means of removing vinyl chloride monomer. Because vinyl chloride monomer has particular solubility characteristics, cooling of the vent gases below 0° C is required. In order to keep equipment size down, solvent systems are normally operated under pressure, which adds to process complexity. A review of this procedure can be found in *Chemical Engineering*, (Vol. 82, No. 25) 1975 pp. 25–26 authored by Iammartino.

Combustion of the vent gas stream to oxidize VCM to carbon dioxide, water, and hydrochloric acid followed by caustic scrubbing of the off gas to remove hydrochloric acid is being practiced commercially on a limited scale. However, the mere description of the process reveals that the process is undesirable since the high cost of the required equipment and fuel must be added to the cost of any polymer produced.

Still another method is the use of refrigerated vent condensors. However, this method is applicable only where the concentration of the inerts in the gas stream to be treated is relatively low. The system requires a high energy requirement to cool the gas stream to minus 29° C and the amount of vinyl chloride remaining in the inert gases is still undesirably high.

Therefore attention has focused upon the carbon adsorption of VCM monomer contained in vent gases, steam stripping the carbon to drive off adsorbed VCM, recovering said VCM and recycling it to the reactor.

Vinyl chloride monomer emissions from the production of polyvinyl chloride generally occur from the reaction media of the reactor itself, slurry tank operations, and purging of VCM from equipment. These streams can be combined before feeding through a carbon bed, or a carbon bed can be provided for each or a combination of these methods. However, even using the preferred carbon methods, certain problems have come to be appreciated by those skilled in the art.

For example, recovered vinyl chloride may also contain residual initiators, suspending agents, catalyst fragments and so forth so that the stream as a whole can autopolymerize to form polyvinyl chloride under certain high temperature conditions. This polymer formed in the carbon bed fouls the carbon bed and greatly decreases its effectiveness and life. It has therefore been necessary that operating conditions be maintained such that polymerization on the carbon bed is avoided. This is necessary in order to obtain a practical service life at adequate bed capacity. This has been done in the past by methods such as cooling the carbon bed either by an internal coil or by jacketing the bed with a heat exchange type jacket. However, these isothermal treatments are expensive in terms of bed size and equipment design.

It would therefore be of great benefit to provide a method of maximizing VCM adsorption on carbon beds without encountering the problems of the prior art.

It is therefore an object of the present invention to provide a method for maximizing VCM adsorption on dry carbon beds. Other objects will become apparent to those skilled in this art as the description proceeds.

It has now been surprisingly discovered in accordance with the present invention that when high concentrations of VCM in a feed gas stream are diluted with a gas inert with respect to the adsorption of VCM on carbon under adiabatic conditions, but polymerization and formation of undesirable chemicals can be avoided by a simple dilution of the feed gas into a range where maximum adiabatic adsorption occurs while maintaining lower temperatures. The amount of dilution required for a VCM feed stream of any concentration in order to achieve near maximum adiabatic adsorption can be found as described hereinafter.

The adiabatic VCM loading and final average carbon temperature can be found from the simultaneous solution of the energy balance (Equation 1) and an equation describing the VCM loading as a function of VCM partial pressure (Equation 2) for the loading and the temperature; with appropriate values for some of the parameters in the equations stated in Equations 3, 4, and 5.

$$QL = C_{pc}(T - T_b) + L(C_{pa}D + C_{pvcm})(T - T_o)$$
$$LC_{pa}F + (T - T_1) \tag{1}$$

$$L = (aP^b/1 + aP^b) \tag{2}$$

$$Q = 490 - 0.262L \tag{3}$$

$$a = 0.729 \exp(-0.0209\ T) \tag{4}$$

$$b = 1.370 \exp(0.006424\ T) \tag{5}$$

DEFINITIONS $Q$ = heat of adsorption (BTU/lb VCM)
$L$ = VCM loading on carbon (lb VCM/lb carbon)
$C_{pc}$ = heat capacity of carbon (0.45 BTU/lb carbon °C)
$T$ = final carbon temperature (° C)
$T_b$ = initial carbon temperature (° C)
$C_{pa}$ = inert gas heat capacity (e.g. 0.43 BTU/lb ° C for air)
$D$ = inert ratio (lb inert gas in undiluted feed/lb VCM)
$C_{pvcm}$ = VCM heat capacity (0.42 BTU/lb ° C)
$T_o$ = gas feed temperature (° C)
$P$ = VCM partial pressure (psia)
$a,b$ = constants relating to carbon and temperature F = dilution factor (lb dilution gas/lb VCM in feed)
$T_I$ = dilution gas temperature The values of the heat of adsorption and the adsorption equation constants for carbon and temperature (a and b) shown in Equations 3, 4, and 5 were obtained from experimental isothermal adsorption data using Calgon PCB 12×30 carbon. The values of the heat capacities are available in the literature or from manufacturer specifications for the carbon. The solution of these equations at a given system pressure, initial bed temperature, and feed and dilution gas temperature as a function of dilution of the feed is plotted as a graph as shown in FIGS. 1 through 6. The loading versus final VCM concentration after dilution can have a maximum at a certain concentration i.e., $(\delta L/\delta C) = O$, $(\delta^2 L/\delta C^2) < O$ where C = VCM concentration. This is the concentration to which the feed stream should be diluted.

An example of this procedure is shown in FIGS. 1-6 where the effect of pressure, initial carbon bed temperature and feed gas temperature on adiabatic temperature and carbon loading are shown with the constraints that the dilution gas temperature equal the feed gas temperature. An examination of the figures will show that the maximum loading occurs between 4,000 and 12,000 ppmv VCM except at extremely high feed gas temperatures or high pressures. Normally these high temperatures or pressures will not be utilized in a commercial unit because of the polymerization and/or other dileterious reactions which occur. Dilution of the feed gas stream may also cool hot feed streams allowing the loading to improve since dilution gases may often be cooler than process exhaust streams. For example, a reduction in conentration from about 50 volume percent VCM to around 8 to 10 thousand ppmv VCM would require sufficient dilution that the feed gas stream would be essentially at the temperature of the diluent.

The term "adiabatic conditions" as used in this specification and claims are meant to refer to essentially adiabatic conditions, since adiabatic conditions are a theoretical ideal and will not be attained in a commercial operation. However, under the conditions of the present invention, no external heat input or removal apart from the feedstream entering the carbon adsorption bed will be effected.

The present invention provides a method for maximizing adsorption of VCM from vapor gas on dry carbon beds under essentially adiabatic conditions. The adsorption is carried out at pressures of from 0 to 120 pounds per square inch gauge and initial bed temperatures of from around 60° F to about 200° F. The invention is applicable where in the initial concentration of vinyl chloride monomer in the vapor gas is higher than 12,000 ppmv. In the temperature and pressure range set forth above, the VCM is diluted with a gas inert with respect to the adsorption of VCM on carbon to a concentration in the range of from about 4,000 to about 12,000 ppmv. Preferred concentrations are from about 7 to about 10,000 ppmv.

It is known that upon a dry carbon bed the adsorption of VCM is an exothermic reaction and the heat of adsorption will raise the temperature of the bed as adsorption occurs. Unfortunately, this heat of adsorption will take the temperature of the bed out of the range of maximum adsorption thus not fully utilizing the potential of the bed. By the process of the instant invention the inlet gas is diluted to a concentration wherein the heat of adsorption is effectively carried through the bed and VCM adsorption on the carbon is maximized. In addition, a benefit is obtained by the reduction of the high temperature reactions such as polymerization and undesirable chemical formation (hydrochloric acid and the like) which are detrimental to the adsorption. The inert gas can be any gas which is inert with respect to the adsorption of VCM on carbon. Most preferred gases would be carbon dioxide and nitrogen. Air can be used but only if the initial concentration of vinyl chloride monomer is sufficiently low that explosion limits are not reached at the temperature of the bed.

In the process of the instant invention, a gas stream containing vinyl chloride monomer is passed through a valve into a detector before entering the carbon bed. The valve is equipped to allow air to enter the gas stream. The detector can be any one of a number of known instruments for detecting vinyl chloride monomer. One of the most common would be an in-line gas chromatograph which will analyze the stream concentration of vinyl chloride monomer. When the monomer content exceeds that desired, the valve will be open to admit sufficient inert gas to bring the vinyl chloride monomer concentration to a level within the optimum range for the particular bed temperature at which adsorption is being carried out. Pressures and flow rates are adjusted to maintain the desired flow through the carbon bed. A second detector in the exit line detects a preconcentration breakthrough when the bed is fully loaded and requires regeneration.

The invention is more concretely described with reference to the example below wherein all parts and percentages are by weight unless otherwise specified. The example is intended to illustrate the instant invention and should not be construed to limit it.

EXAMPLE

A comparison can be carried out using a carbon bed under 50 pounds per square inch absolute (psia) having an initial temperature of 37.8° C. and a feed VCM concentration of 50 volume percent at a feed temperature of 15.6° C.

Figure 2:
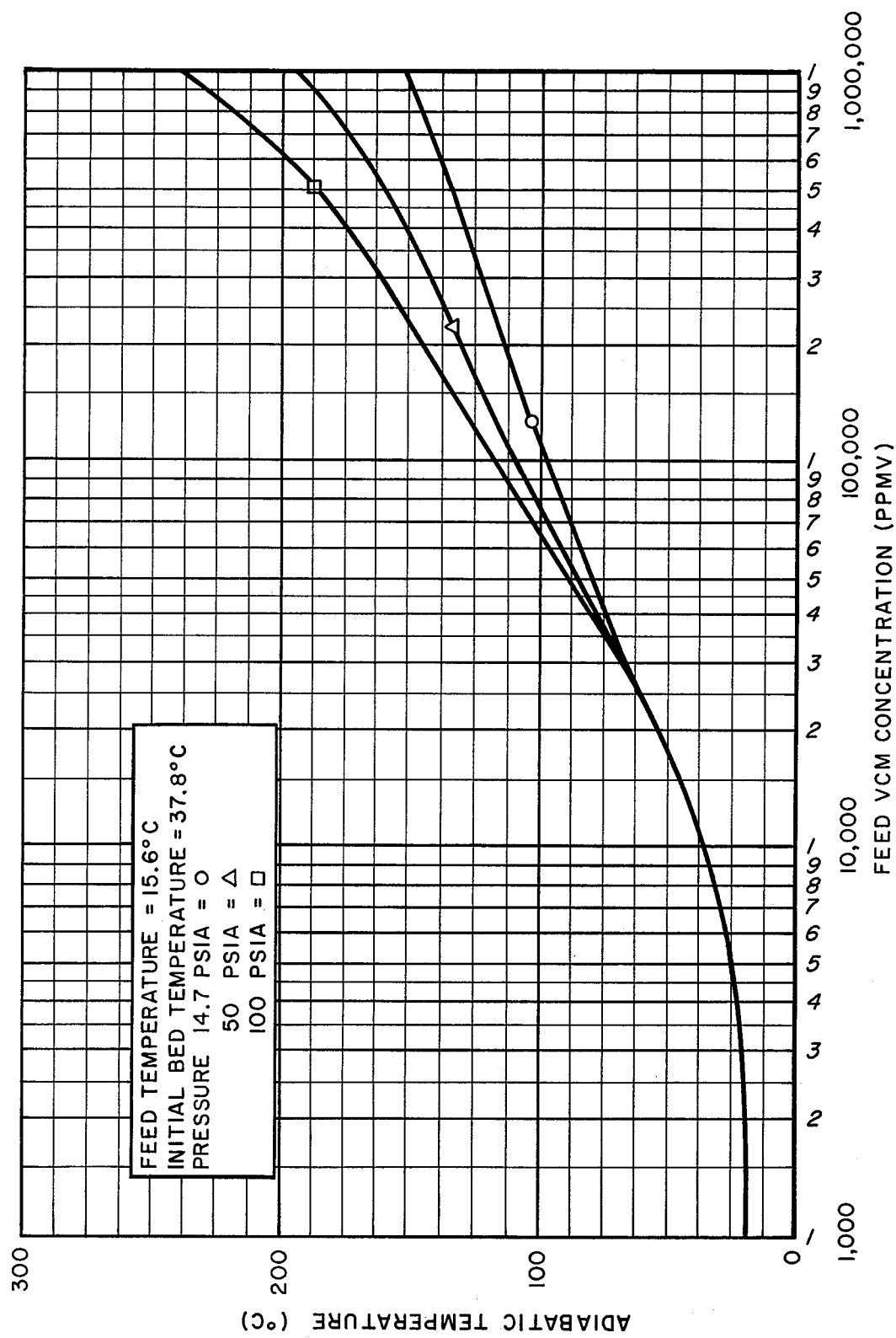
Figure 3:
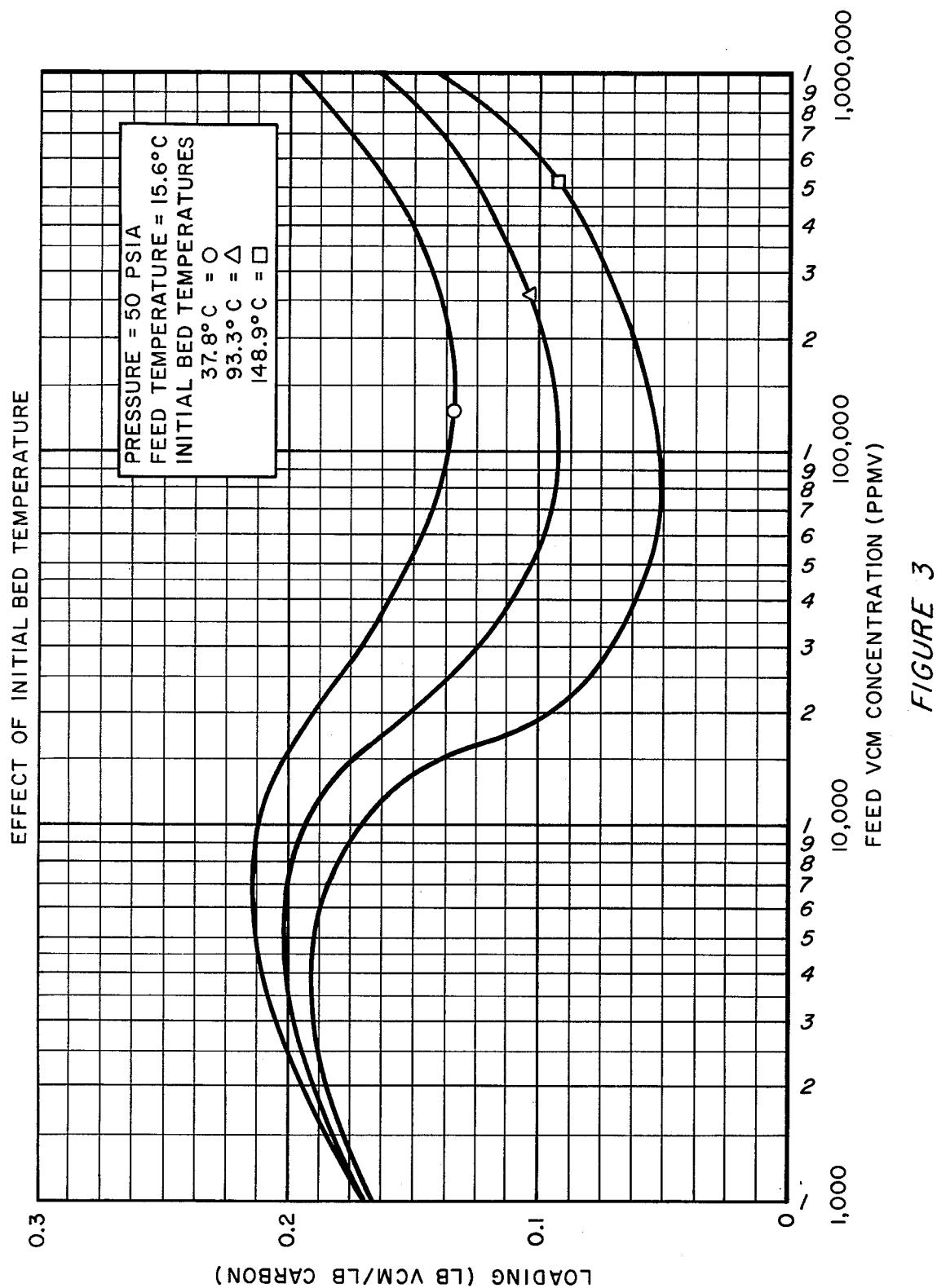
Figure 4:
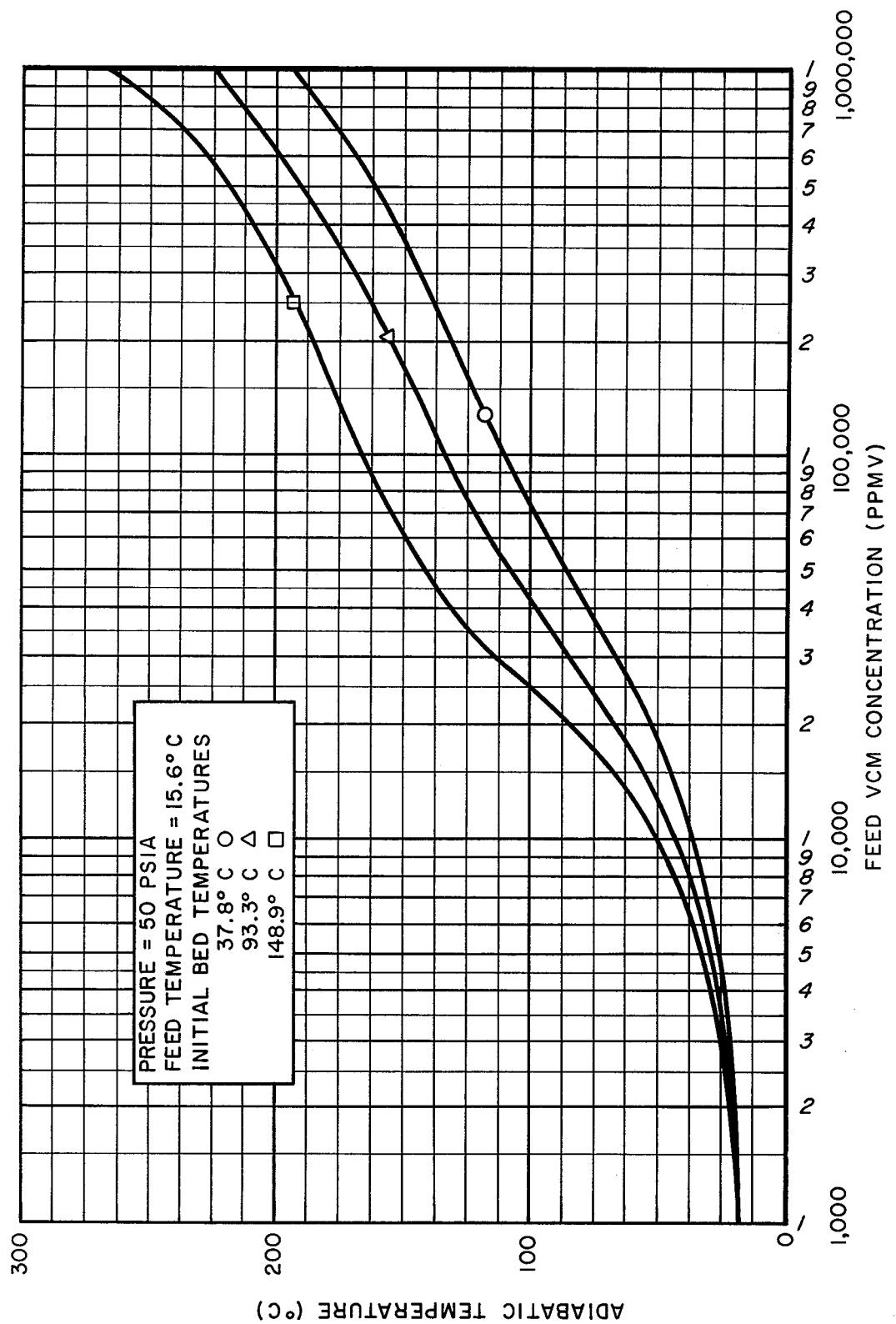
Figure 5:
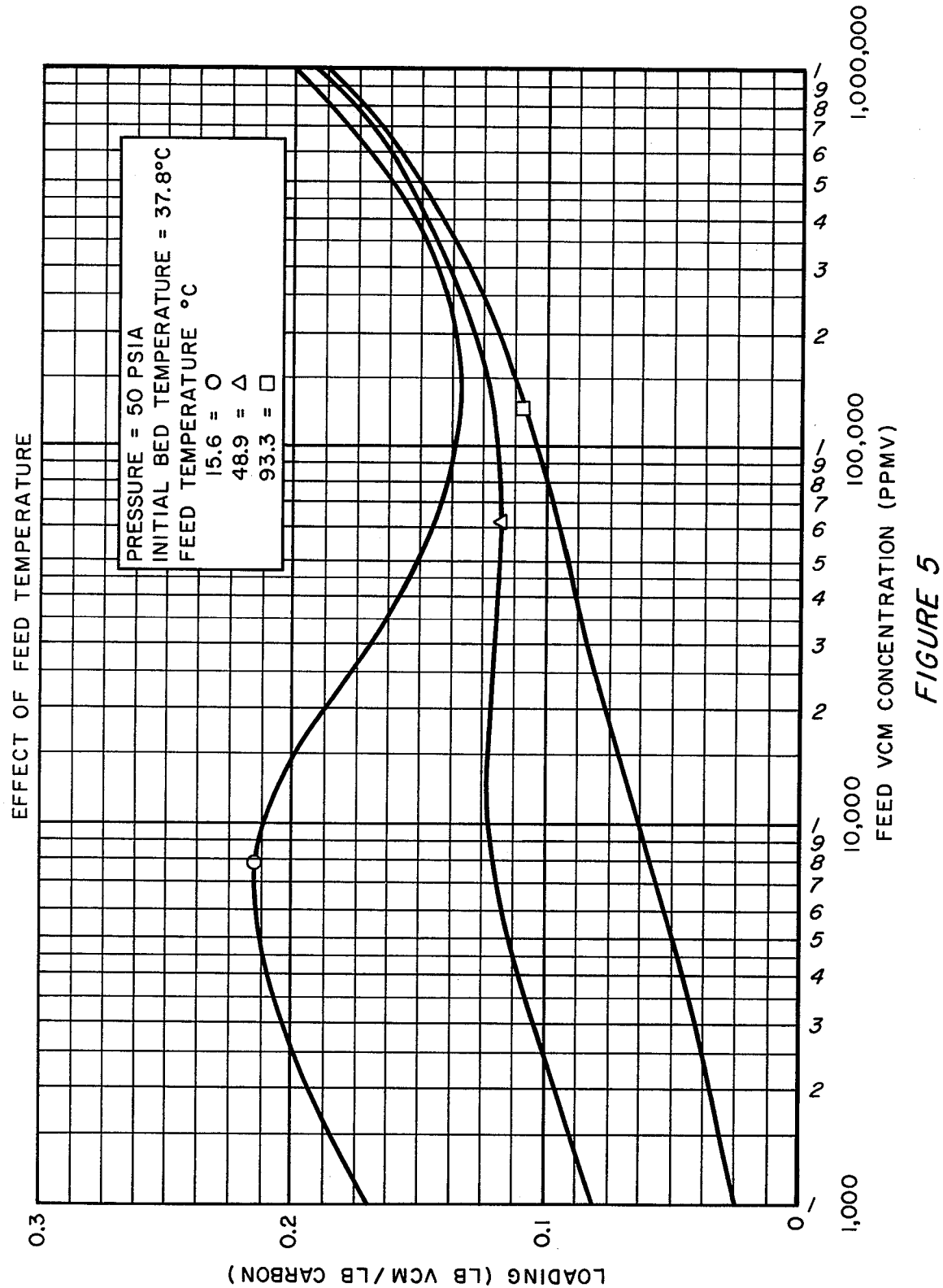
Figure 6:
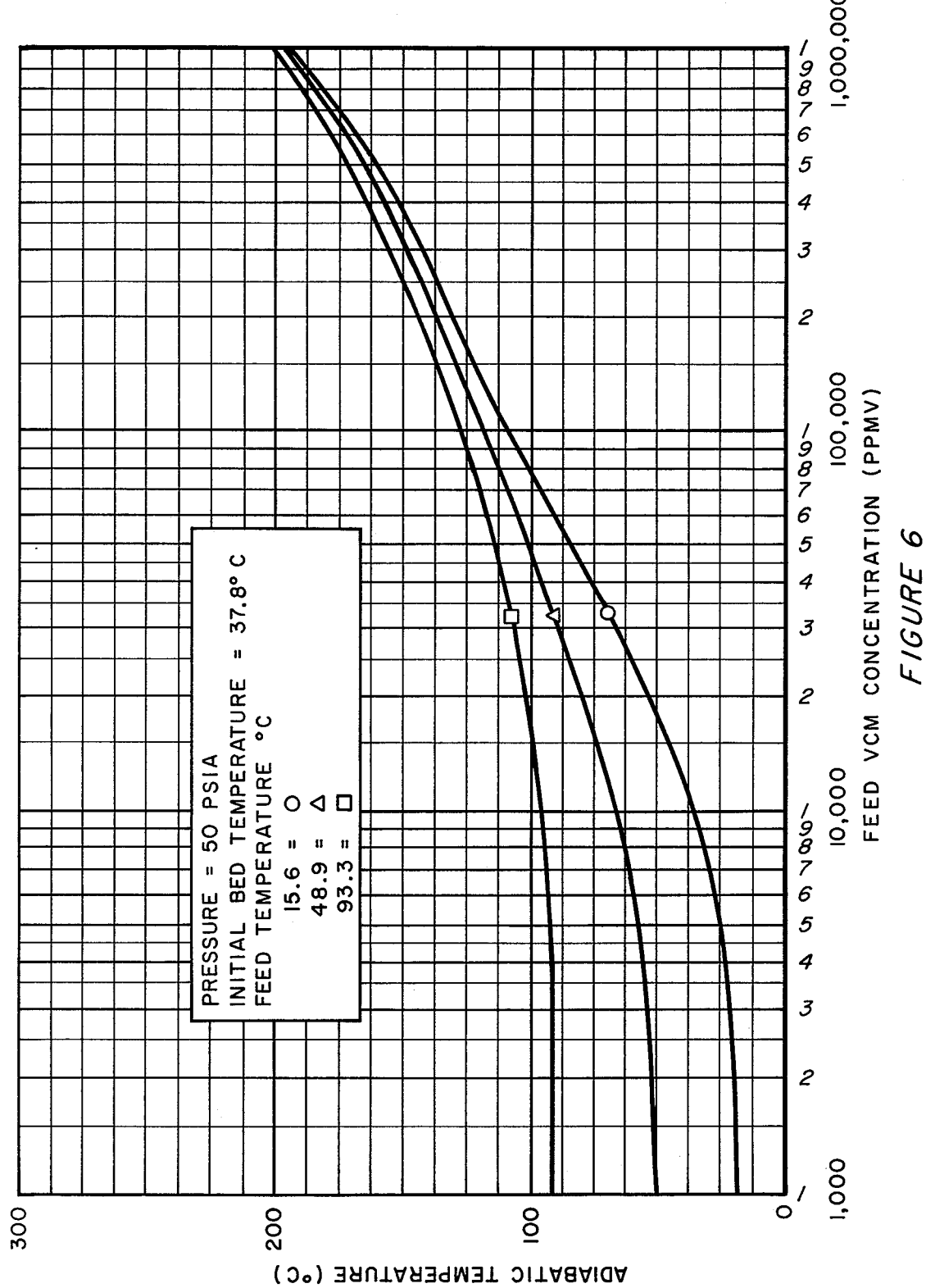

If no dilution is carried out under the above conditions, the final average bed temperature will be about 162° C. and VCM loading will be about 0.159 lb VCM/lb carbon as seen from FIGS. 1 and 2.

In contrast, when the above stream is diluted with $N_2$ gas which is available at 15.6° C. to an optimum dilution of 66.6 standard cubic feet $N_2$/standard cubic feet undiluted feed, the result is 7,400 ppmv VCM concentration, yielding an average bed temperature of about 31° C. and a bed loading of 0.215 lb VCM/lb carbon. This dilution factor can be seen from FIG. 1 to be the point of maximum loading upon dilution of the feed gas for the conditions of this example.

While certain embodiments and details have been shown for the purpose of illustrating this invention, it will be apparent to those skilled in this art that various changes and modifications may be made herein without departing from the spirit and or the scope of the invention.

We claim:

1. An improved method for the adsorption of VCM from vapor gas on dry carbon beds wherein the initial concentration of VCM and said vapor gas is higher than 12,000 parts per million by volume (ppmv), the improvement comprising diluting the vapor gas with a gas inert with respect to the adsorption of VCM on carbon to a concentration of from about 4,000 ppmv to about 12,000 ppmv and carrying out the adsorption under essentially adiabatic conditions at pressures of from about 120 pounds per square inch gauge (psig) and initial bed temperatures of from about 60° F to about 200° F.

2. A method as described in claim 1 wherein the inert gas is selected from the group consisting of carbon dioxide, nitrogen, air, and vent gas having VCM previously removed.

3. A method as described in claim 1 wherein the initial carbon bed temperature is 110° F, the pressure is 60 pounds per square inch actual, and the vinyl chloride monomer concentration in the vapor gas is adjusted to about 8,000 ppmv.

* * * * *